May 23, 1944.  R. L. DOAN  2,349,250
GAS DETECTION
Filed Oct. 9, 1939  3 Sheets-Sheet 1
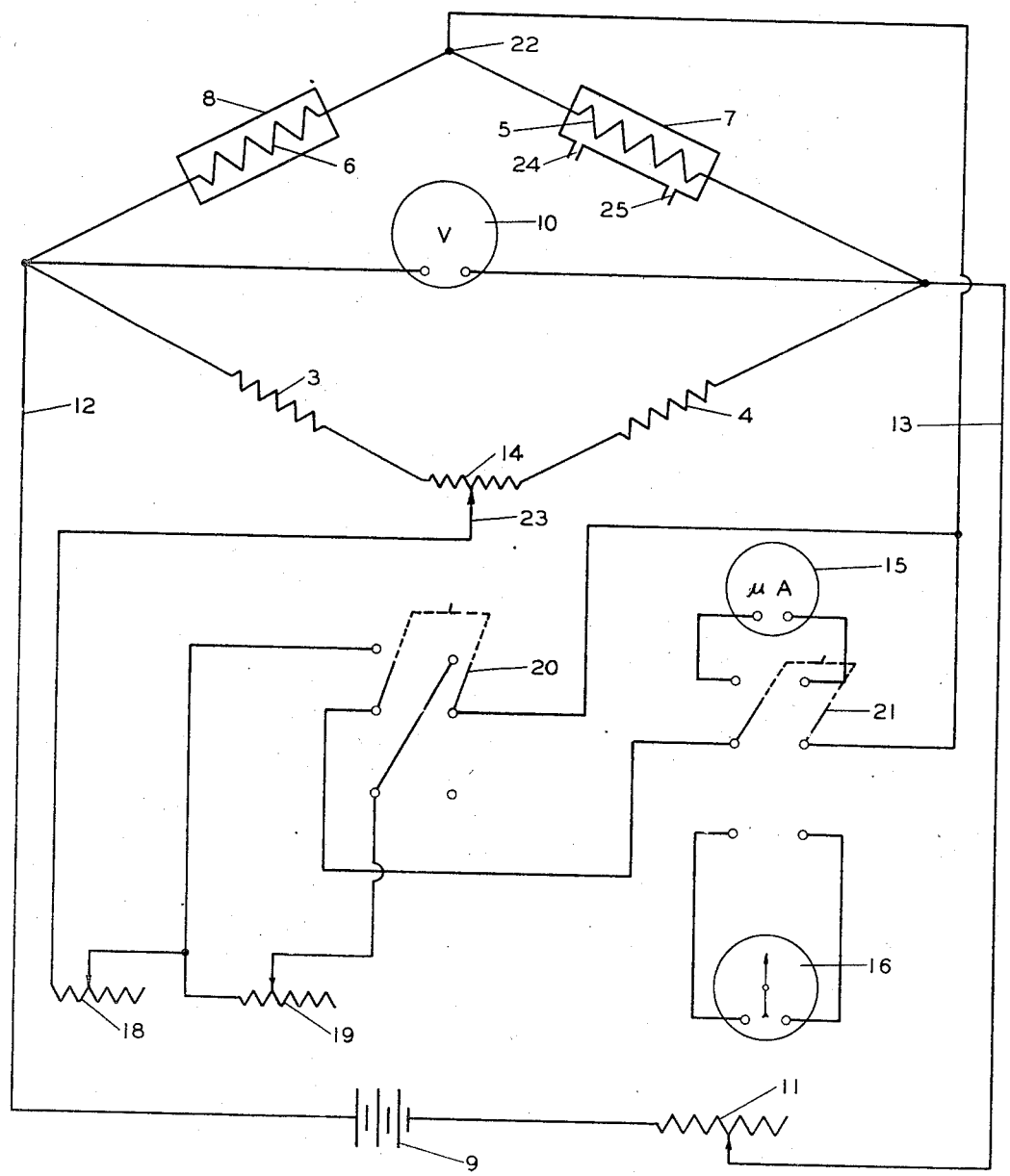
FIG. I
INVENTOR
R. L. DOAN
BY
Hudson, Young, Shanley & Yinger
ATTORNEYS

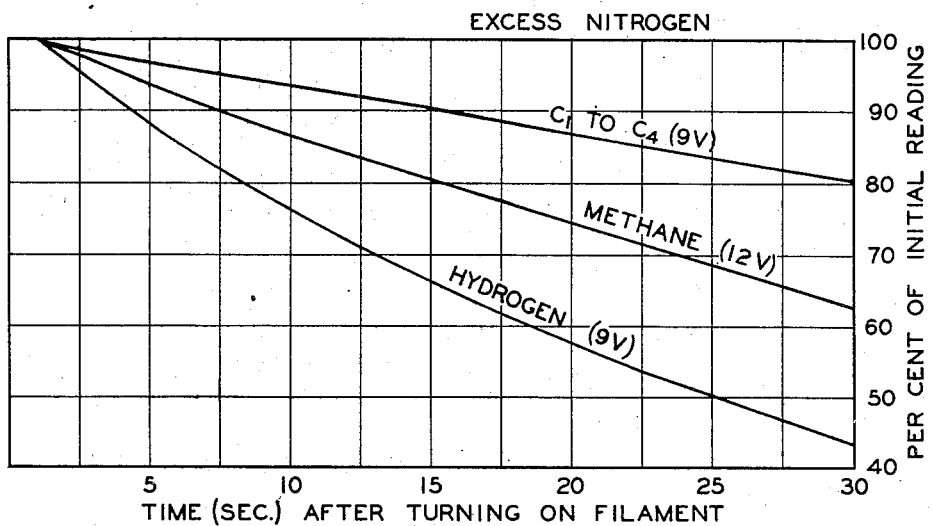
FIG. 2 BURNING RATE OF COMBUSTIBLE GASES AS INDICATED BY ELECTRICAL GAS DETECTOR
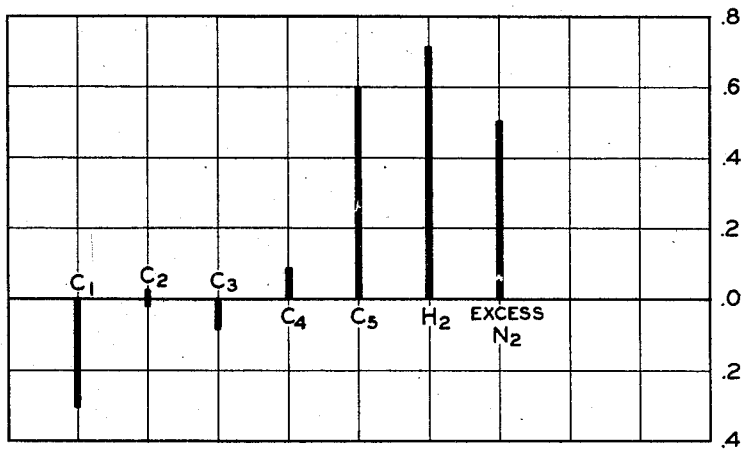
FIG. 3 RATIO OF 5V TO 9V READING
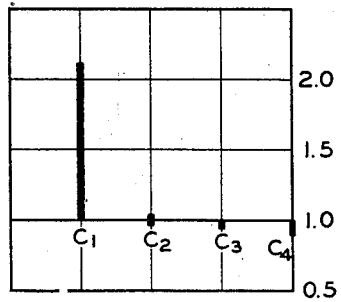
FIG. 4 RATIO OF 12V TO 9V READING

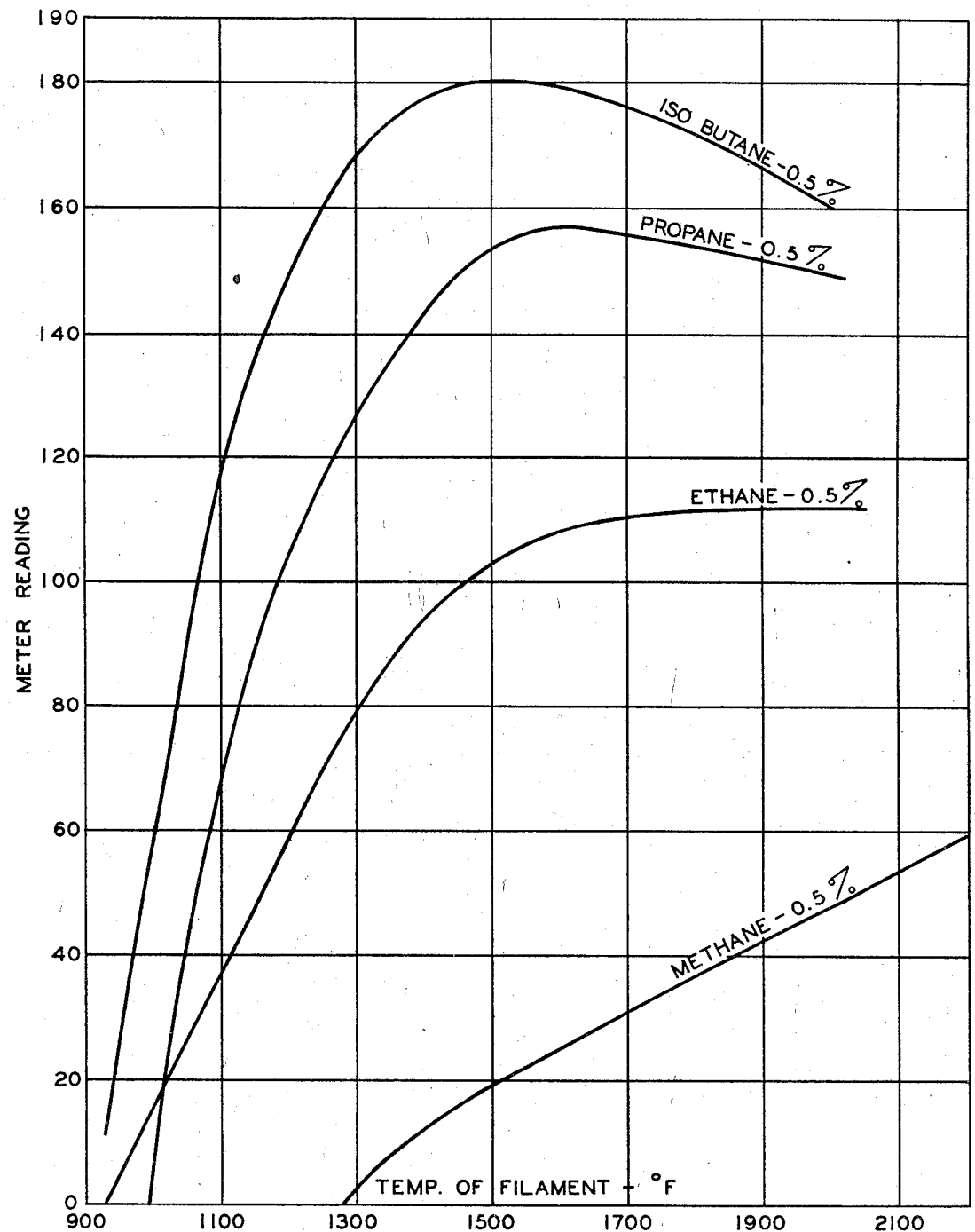
FIG. 5 EFFECT OF FILAMENT TEMPERATURE ON COMBUSTION OF HYDROCARBON GASES Patented May 23, 1944

2,349,250

UNITED STATES PATENT OFFICE 2,349,250

GAS DETECTION

Richard L. Doan, Bartlesville, Okla., assignor to Phillips Petroleum Company, a corporation of Delaware Application October 9, 1939, Serial No. 298,708

3 Claims. (Cl. 23—232).

This invention relates to the detection of combustible gases in fluid mixtures and more particularly it relates to the determination of the presence and/or amount of combustible gas present in a mixture.

Within the last decade, there has been considerable interest in the possibility of locating petroleum beds by detecting seepage of gases through the earth strata overlying the petroleum bed. Laboratory experiments have shown a good physical basis for the hypothesis that over a long period of time the strata above a deposit of oil and gas might well acquire small amounts of hydrocarbon gas due to the slow diffusion of gases through these beds. The determination of the hydrocarbon concentration in free soil gas or in gas adsorbed on the soil particles thus becomes a matter of considerable importance from an exploration viewpoint. Likewise in the drilling of wells which penetrate successive subsurface strata the drilling mud becomes gradually charged with gas as the drill approaches gas or oil bearing horizons and it is important to be able to detect small changes in the combustible gas content of the mud in order to avoid passing up possible productive strata.

Methods and apparatus heretofore available for detecting small percentages of hydrocarbons have suffered numerous disadvantages. Apparatus capable of the desired accuracy was unwieldly or too fragile to be carried about from place to place in the field. Methods were so time consuming as to limit the number of samples that could economically be taken.

Gas analyzing apparatus has previously been constructed in which the combustible constituent in a gaseous mixture was burned on the surface of a heated platinum filament. The additional heat supplied by the oxidation of the gas increased the temperature of the filament which resulted in an increase in its electrical resistance. The change in resistance was then measured electrically, generally employing a Wheatstone bridge circuit, the platinum filament constituting one of the arms of the bridge circuit. Although apparatus of this type has been employed successfully in testing for combustible gases in mines and in the analysis of exhaust gases from motors and furnaces, it was found to have numerous disadvantages when applied to the analysis of soil gases. The chief disadvantage was its lack of sensitivity especially when making quantitative determinations for very small percentages of the combustible constituent. The method of employing such apparatus has been to pass the gaseous mixture over the heated catalytic filament in a continuous stream and many devices have been patented for controlling the flow of this gas stream. Two things happen when the gas stream is passed over an incandescent catalytic filament. Ignition and combustion of the gas takes place on the surface of the filament, tending to increase the filament temperature, and at the same time, there is a cooling of the filament due to convection, conduction and radiation. If the percentage of combustible constituents in the gaseous mixture being tested is very small, the change in the filament temperature, due to combustion, may be completely masked by the cooling of the filament by the flowing gas stream. Other sources of error involved in employing a flowing gas stream are thermal drift due to heating of the apparatus and changes in filament resistance due to volatilization of the filament or poisoning of the filament by impurities.

In the present invention, measurements are made while there is no flow of gas through the filament container. A filament of small diameter is employed, giving a high sensitivity. Losses by volatility are minimized by heating the filament for only a short time during each determination. Thermal drift and changes in filament resistance are compensated for by checking the filament in standard air before and after each gas analysis.

An important object of the present invention is to provide a method for the rapid detection of combustible gas.

Another object is to provide a basis for partial identification of the combustible constituents.

A further object is to provide a method for the quantitative determination of combustible gases when present in an air mixture.

Another object is to provide an improved gas testing method of greater sensitivity and accuracy, especially when used to determine minute quantities of combustible gas.

Another object is to provide a novel method for increasing and stabilizing the sensitivity of filaments.

Still another object is to provide a novel method of balancing spiral filaments used in an electrical circuit.

Figure 1 is a diagrammatic view of apparatus for carrying out the invention.

Figures 2–5 inclusive are graphs illustrating methods of interpreting detector observations.

The construction involves the application of the principle of the so-called bridge circuit in which power is applied at two opposite terminals of the bridge and a detecting instrument is connected to the remaining two terminals. In Figure 1 this bridge comprises standard resistances 3 and 4 and filaments 5 and 6. A battery 9 is used to supply substantially uniform electric current to the bridge. The current supplied by the battery may be checked by voltmeter 10, and may be regulated by rheostat 11. Current flowing in conductors 12 and 13 is divided in the bridge, part of the current flowing through filaments 5 and 6 and the remainder flowing through resistances 3 and 4. A rheostat 14 is connected with its resistance element in series with standard resistances 3 and 4. This permits balancing the bridge. Across the bridge, between the terminals 22 and 23 is connected a galvanometer 15 or a microammeter 16 to determine the amount by which the bridge is unbalanced during a determination. Step resistors 18 and 19 are provided for inserting resistances in series with the indicating meter 15 or 16 when necessary. Double switches 20 and 21 with suitable connections allow either meter to be used, as will be understood by those skilled in the art. The preferred embodiments herein disclosed make it possible to use this instrument over a wide range of concentrations in gas-air mixtures.

In using a bridge circuit for the detection of combustible gases, I prefer to use two filaments 5 and 6 separately enclosed in thin metallic containers 7 and 8. One of the containers, 7, is provided with means 24 and 25 for introducing gas samples to be tested. Container 8 is sealed off from the outside air. Filaments 5 and 6 are identical, and are of platinum, although any metal or alloy having similar characteristics, namely, a change in conductivity with change in filament temperature may be used. Filament 6 serves to keep the bridge approximately balanced regardless of the filament temperature since the filaments draw the same current and have approximately the same heating rate. The filaments are formed by coiling platinum wire into the form of a helix. Loops formed in this manner radiate heat to one another and I have discovered that for a given voltage across the bridge, I can vary the resistance of the filaments over a wide range by crowding the loops closer together or pulling them apart. A filament formed in this manner also possesses greater sensitivity to gas detection since a given amount of added heat due to gas combustion will cause a greater temperature rise in a coiled filament than in a straight one. The condition of the surface of the filament is also an important item in the operation of the detector. New filaments often give erratic results or are so insensitive that they fail to respond even to fairly high gas concentrations. I have discovered that the sensitivity of the filaments may be increased and stabilized by heating the same for several minutes at a temperature above 1,000° C.

In operation, standard air is allowed to flow through container 7 to flush out any air or gas previously present. The volume of air used is about five times the volume of the combustion cell. Then the flow is stopped and after several seconds, during which the eddy currents die down, current from battery 9 is applied to the bridge. The bridge is approximately balanced by varying the rheostat 14 and the small unbalance current is read on the meter 15 or 16. The power is cut off and without changing rheostat 14, the cell is flushed out with the gaseous mixture under investigation. After several seconds, current is again applied to the bridge circuit and a new reading obtained. The meter reading is made as soon as the pointer comes to a steady position; usually this occurs one to two seconds after the current is turned on. Finally standard air is again introduced and a third reading taken. The difference between the first and third readings represents the thermal drift during the period of the measurements and the zero of the instrument is taken as the average of these two readings. The difference between this zero and the second reading is proportional to the percentage of the combustible constituent present in the mixture under investigation. The instrument is calibrated by using mixtures containing known percentages of the combustible constituent.

It is essential that water vapor be removed from the air and gas samples before they are admitted to the container for testing or it will introduce a large error in results. Water vapor is removed readily by passing the sample through a tube containing potassium hydroxide pellets.

For most applications of this method of determining the relative conmbustible content of gaseous mixtures, it is unnecessary to differentiate between the various constituents responsible for the observed reading on the gas detector. The bridge method does not readily lend itself to such differentiation but the applicant has developed two methods of determining at least the major constituents which contribute to the instrument reading. Both are based on observed differences in the combustion rate of the various gases at different filament temperatures. The experimental relationships are illustrated graphically in Figures 2, 3, 4 and 5.

It will be seen from Figure 5 that there is considerable difference between the lighter hydrocarbons in respect to their combustion at various filament temperatures. When the temperature is held in the neighborhood of 1250° F. the combustion of methane is almost nil while that of ethane, propane and butane is from 73 to 93 per cent of the maximum obtained at the optimum temperature in the neighborhood of 1600° F. Although not shown on Figure 2, both pentane and hydrogen burn readily at temperatures considerably under 900° F., the instrument readings at this temperature being roughly 60% and 75% respectively of the readings at 1600° F. It will be apparent from these relationships that by making readings on an unknown sample at two or three selected temperatures (or bridge voltages) considerable information can be gained as to the nature of the gas.

The rate at which a given gas is consumed in the combustion unit is indicated by the rate at which the instrument pointer returns to its zero position after the initial deflection. This rate is related to the diffusion velocity of the gas. Differences between various gases with respect to volume combustion rate are shown in Figure 2. From this figure it will be noted that hydrogen disappears most rapidly of any of the gases examined, 50% being consumed during the first 25 seconds after the filament is lighted. This being the case, a given concentration of hydrogen registers a greater effect on the electrical detector in comparison with the more slowly diffusing hydrocarbon gases than would be indicated by considerations of heat of combustion alone. In other words, the detector gauges the total heat supplied by the gaseous combustion taking place at the filament, which is the molecular heat of combustion multiplied by the number of molecules burned per unit of time. The volume heat of combustion of hydrogen is only 30% as great as that of methane, yet because of the much higher diffusion rate of the hydrogen, this gas actually gives a greater initial effect on the electrical detector than does an equivalent concentration of methane. From this fact it will be seen that the number of hydrogen molecules which reach the filament and are burned each second is more than four times as large as the corresponding number of methane molecules when the concentration of the two gases is the same.

In dealing with gas air mixtures, a standard air composition of approximately 21% oxygen and 79% nitrogen is assumed. If the actual composition differs from these values, a deflection will be registered on the electrical detector in accordance with the increase in nitrogen content. The effect is purely one of thermal conductivity. It is not difficult to differentiate this effect from one due to combustion of gas since in the case of the former the deflection will not change with time whereas in the case of the latter the instrument needle will swing back toward zero as the gas is consumed.

Thus it is also possible to tell something of the nature of the gas causing a deflection on the electrical detector by observing the behavior of the instrument pointer following the initial deflection. The rapid return towards zero indicates hydrogen, moderate rapid return indicates hydrocarbon gases and no return indicates excess nitrogen. This is of course purely qualitative but when used in conjunction with the method described above, permits rather definite conclusions to be drawn.

Taking an unknown sample and making three different measurements with 5 volts, 9 volts, and 12 volts in each case across the filament, observations of detector readings will be susceptible of ready interpretation. The voltages named correspond approximately to filament temperatures of 900° F., 1650° F., and 2100° F., respectively. If the 12-volt reading is much larger than the 9-volt reading and the 5-volt is negative, the gas is methane, the negative reading being due to the greater thermal conductivity of methane as compared with air. As pointed out above, methane does not start to burn until the filament reaches a temperature in the neighborhood of 1250° F. If the 12-volt reading is less than the 9-volt reading and the 5-volt reading is approximately zero, propane or butane is indicated. If the 5-volt reading is from ½ to ¾ of the 9-volt reading, the gas may be either pentane, hydrogen or excess nitrogen. Combining these results with observations on the movement of the instrument pointer, the following conclusions can be drawn:

1. If the pointer moves slowly back toward its zero position, pentane is the major constituent.
2. If the pointer swings back rapidly, hydrogen is the major constituent.
3. If the pointer shows no tendency to move back toward zero, excess nitrogen is present.

It is understood that the methods described in connection with this invention are to be taken as preferred examples of the same, and that various changes may be made without departing from the spirit of the invention or the scope of the claims.

I claim:

1. The method of analyzing soil gas for hydrocarbons heavier than methane in the presence of methane contained in the soil gas which comprises passing the soil gas into a vessel into contact with a filament in the vessel, cutting off all flow of gas to said vessel and allowing turbulence of the gas in the vessel to subside, thereafter heating the filament to a temperature in the range of 900° F. to 1250° F. by passage of electric current therethrough, and determining the quantity of hydrocarbons heavier than methane present in the soil gas by observing the rate of combustion thereof as evidenced by changes in the electrical resistance of the filament due to heat liberated by combustion of hydrocarbons heavier than methane.

2. The method of analysis of soil gas for hydrocarbons present in the soil gas which comprises passing successive portions of a soil gas sample into a vessel into contact with a filament in the vessel, cutting off all flow of gas to said vessel after admission of each successive sample and allowing turbulence of the gas in the vessel to subside, heating the filament in contact with a first portion of the soil gas sample to a temperature within the range of 900° F. to 1250° F. by passage of electric current therethrough, determining the quantity of hydrocarbons heavier than methane present in the sample by measuring the changes in the electrical resistance of the filament due to the presence of hydrocarbons heavier than methane, heating the filament in contact with a second portion of the sample to a temperature in the range of 1250° F. to 2100° F., and determining the quantity of hydrocarbons present in the sample by measuring the changes in the electrical resistance of the filament to permit calculation of the amount of methane present in the soil gas sample.

3. The method of analyzing soil gas by use of a filament which comprises passing successive portions of a soil gas sample into contact with the filament contained in a vessel; cutting off all flow of gas to the vessel after admission of each successive portion and allowing turbulence of the gas to subside; heating the filament in contact with a first portion of the soil gas sample to a temperature in the region of about 900° F. by passage of electric current therethrough; qualitatively determining the presence of pentane, hydrogen, or excess nitrogen by observing the rate of change of the electrical resistance of the filament; heating the filament in contact with a second portion of the soil gas sample to a temperature in the region of about 1650° F. by passage of electric current therethrough; qualitatively determining the presence of propane and butane by observing the rate of change of the electrical resistance of the filament; heating the filament in contact with a third portion of the soil gas sample to a temperature in the region of about 2100° F. by passage of electric current therethrough; and qualitatively determining the presence of methane by observing the rate of change of electrical resistance of the filament.

RICHARD L. DOAN.